US011551233B1

(12) United States Patent
Rhoades et al.

(10) Patent No.: US 11,551,233 B1
(45) Date of Patent: Jan. 10, 2023

(54) SYSTEM AND METHOD FOR GOVERNING EXECUTION OF A GEOGRAPHY DEPENDENT COMPUTER PROCESS

(71) Applicant: Pizza Hut Connect, LLC, Plano, TX (US)

(72) Inventors: Richard Chuck Rhoades, Denton, TX (US); Stephen Thomas Miller, Richardson, TX (US); LaShunda Patrece Lewis, Dallas, TX (US)

(73) Assignee: Pizza Hut Connect, LLC, Plano, TX (US)

( * ) Notice: Subject to any disclaimer, the term of this patent is extended or adjusted under 35 U.S.C. 154(b) by 0 days.

(21) Appl. No.: 16/773,597

(22) Filed: Jan. 27, 2020

(51) Int. Cl.
*G06Q 30/00* (2012.01)
*G06Q 20/40* (2012.01)
*G06F 16/29* (2019.01)
*G06F 16/2455* (2019.01)
*G06Q 30/06* (2012.01)
(Continued)

(52) U.S. Cl.
CPC ..... *G06Q 20/405* (2013.01); *G06F 16/24556* (2019.01); *G06F 16/24564* (2019.01); *G06F 16/29* (2019.01); *G06Q 10/083* (2013.01); *G06Q 20/1235* (2013.01); *G06Q 30/0607* (2013.01); *G06Q 30/0633* (2013.01);
(Continued)

(58) Field of Classification Search
CPC ........... G06Q 30/0601–0643; G06F 16/24556; G06F 16/24564; G06F 16/29; G06F 3/0484
See application file for complete search history.

(56) References Cited

U.S. PATENT DOCUMENTS 6,598,027 B1 * 7/2003 Breen, Jr. .............. G06Q 30/08
705/26.25
7,308,423 B1 12/2007 Woodward et al.
(Continued)

FOREIGN PATENT DOCUMENTS

GB 2362242 A 11/2001

OTHER PUBLICATIONS

Online wine takes root. (2000). Beverage Industry, 91(1), 16. Retrieved from https://dialog.proquest.com/professional/docview/1085670745?accountid=131444.*
(Continued)

*Primary Examiner* — Naeem U Haq
(74) *Attorney, Agent, or Firm* — McDermott Will & Emery LLP

(57) ABSTRACT

Methods and systems for governing execution of a geography dependent computer process are provided. In one aspect, a method includes receiving a target location comprising a geographic identifier. The method also includes accessing a data store comprising a plurality of maps. Each map of the plurality of maps includes a plurality of geometric shapes and each geometric shape is associated with an execution rule. The method also includes determining which geometric shape of the plurality of geometric shapes the geographic identifier is bounded within for at least two maps of the plurality of maps. The method further includes generating an aggregate rule set based on each execution rule associated with each geometric shape determined to bound the geographic identifier. The method further includes applying the aggregate rule set. Machine-readable media are also provided.

30 Claims, 13 Drawing Sheets

(51) Int. Cl.
  *G06Q 10/08* (2012.01)
  *G06Q 20/12* (2012.01)
  *G06F 3/0484* (2022.01)
  *G06F 16/23* (2019.01)

(52) U.S. Cl.
  CPC ..... *G06Q 30/0641* (2013.01); *G06Q 30/0643* (2013.01); *G06F 3/0484* (2013.01); *G06F 16/2379* (2019.01)

(56) References Cited

U.S. PATENT DOCUMENTS

| | | | |
|---|---|---|---|
| 7,383,233 B1 | 6/2008 | Singh et al. | |
| 7,486,943 B2 | 2/2009 | Choti et al. | |
| 7,801,772 B2 | 9/2010 | Woodward et al. | |
| 8,010,411 B2 | 8/2011 | Woodward et al. | |
| 8,066,565 B2 | 11/2011 | Fotevski | |
| 8,095,427 B1* | 1/2012 | Buxton | G06Q 30/0613 705/26.25 |
| 8,538,826 B1 | 9/2013 | Lai et al. | |
| 8,880,428 B2 | 11/2014 | Woodward et al. | |
| 10,282,766 B2* | 5/2019 | Rellas | G06Q 30/0261 |
| 2002/0123957 A1* | 9/2002 | Notarius | G06Q 30/0601 705/26.1 |
| 2003/0065571 A1* | 4/2003 | Dutta | G06Q 30/0607 705/26.25 |
| 2004/0064334 A1* | 4/2004 | Nye | G06Q 30/018 705/317 |
| 2006/0085275 A1* | 4/2006 | Stokes | G06Q 30/00 705/27.1 |
| 2006/0242060 A1* | 10/2006 | Boutin | G06Q 40/04 705/37 |
| 2007/0055580 A1* | 3/2007 | Woodward | G06Q 30/0633 705/26.1 |
| 2007/0185785 A1 | 8/2007 | Carlson et al. | |
| 2008/0269947 A1* | 10/2008 | Beane | G06Q 20/40 700/241 |
| 2009/0158185 A1* | 6/2009 | Lacevic | G09B 29/005 715/768 |
| 2009/0164376 A1* | 6/2009 | Guthrie | G16H 40/67 705/50 |
| 2009/0231190 A1* | 9/2009 | Grumbles | G09B 29/007 342/357.57 |
| 2011/0238593 A1* | 9/2011 | Hearnes, II | G06F 16/955 705/341 |
| 2012/0278250 A1* | 11/2012 | Miller | G06Q 30/0607 705/331 |
| 2013/0036057 A1* | 2/2013 | Hendrix | G06Q 30/0607 705/65 |
| 2013/0151373 A1* | 6/2013 | Flanagan | G06Q 30/0607 705/26.25 |
| 2014/0074531 A1 | 4/2014 | Sylvester et al. | |
| 2014/0279221 A1* | 9/2014 | Woodward | G06Q 30/0607 705/26.25 |
| 2014/0310125 A1 | 10/2014 | Gopinath et al. | |
| 2014/0379448 A1* | 12/2014 | Gregory | G06Q 30/0607 705/26.44 |
| 2016/0071175 A1* | 3/2016 | Reuss | G06Q 20/4014 705/26.25 |
| 2019/0050921 A1* | 2/2019 | Ryner | G06Q 20/3224 |
| 2019/0197544 A1* | 6/2019 | Frost | G06Q 20/12 |
| 2021/0158413 A1* | 5/2021 | Kello | G06Q 20/405 |
| 2021/0352131 A1* | 11/2021 | Madden, III | H04W 12/63 |

OTHER PUBLICATIONS

No Author "Possible Anticompetitive Barriers to E-Commerce: Wine" Federal Trade Commission Jul. 2003. Retrieved from https://www.ftc.gov/sites/default/files/documents/reports/possible-anticompetitive-barriers-e-commerce-wine/winereport2_0.pdf (Year: 2003).*

Denise Castillo "A guide to wine e-commerce, digital disruptors, D2C sales and industry innovation" Dec. 2019. Retrieved from https://www.sana-commerce.com/blog/a-2019-guide-to-wine-e-commerce-digital-disruptors-d2c-sales-and-industry-innovation/ (Year: 2019).*

* cited by examiner

SYSTEM AND METHOD FOR GOVERNING EXECUTION OF A GEOGRAPHY DEPENDENT COMPUTER PROCESS

BACKGROUND

Execution of some computer processes are regulated by various laws, regulations, and other administrative rules. For example, the use and distribution of encryption technology is regulated by export control laws. The execution of certain electronic media is regulated by digital rights management policies and copyright law. Certain e-commerce transactions, for example, banking transactions or the purchase and delivery of certain products, such as alcohol and prescription drugs, may be regulated by national, state, and local laws as well as vendor set rules and regulations. The applicability of many of these rules and regulations are triggered based on a geographic location associated with the execution of the process, such us a download destination, a media playback location, or a delivery address. Managing the execution of such computerized processes can be computationally intensive and technically challenging to maintain, particularly given the variation in and dynamic nature of applicable laws, regulations, and rules and the varying and sometimes overlapping boundaries that determine which of such laws, regulations, and rules apply.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for governing execution of a geography dependent computer process is provided. The method includes receiving a target location comprising a geographic identifier. The method also includes accessing a data store comprising a plurality of maps. Each map of the plurality of maps includes a plurality of geometric shapes and each geometric shape is associated with an execution rule. The method also includes determining which geometric shape of the plurality of geometric shapes the geographic identifier is bounded within for at least two maps of the plurality of maps. The method further includes generating an aggregate rule set based on each execution rule associated with each geometric shape determined to bound the geographic identifier. The method further includes applying the aggregate rule set.

In some implementations, the geography dependent computer process includes one of an online transaction, an electronic media execution process, an electronic commerce transaction, and a software download process. In some implementations, the geography dependent computer process is an electronic commerce transaction. In some implementations, applying the aggregate rule set includes determining, based on applying the aggregate rule set, whether execution of the geography dependent computer process is permissible. In such implementations, applying the aggregate rule set also includes executing, in response to determining execution of the geographic computer process is permissible, the geography dependent computer process. In some implementations, executing the geography dependent computer process further includes displaying, on a menu via a graphical user interface, at least one regulated item. In some implementations, applying the aggregate rule set includes determining whether a purchase selection request of at least one regulated item is permissible based on the aggregate rule set. In such implementations, applying the aggregate rule set also includes adding, based on determining the purchase selection request of the at least one regulated item is permissible, the at least one regulated item to an electronic shopping cart. In some implementations, the method further includes determining, based on the aggregate rule set, whether purchase and delivery of at least one regulated item is permissible. In such implementations, the method also includes permitting, in response to determining that purchase and delivery of the at least one regulated item is permissible, purchase and delivery of the at least one regulated item to the target location via the e-commerce transaction. In some implementations, the method further includes determining, based on applying the aggregate rule set, whether execution of the geography dependent computer process is permissible. In such implementations, the method also includes restricting, in response to determining execution of the geographic computer process is impermissible, a regulated item from being displayed on a menu via a graphical user interface. In some implementations, the plurality of geometric shapes of each map corresponds to predetermined boundaries selected from one of state borders, county borders, city borders, zoning districts, and delivery zones. In some implementations, each geometric shape of the plurality of geometric shapes in a given map is non-overlapping. In some implementations, the method further includes adding, in the data store, a new map to the plurality of maps, wherein the new map comprises a plurality of geometric shapes that are associated with new executions rules that are distinct from execution rules associated with the plurality of maps existing in the data store. In some implementations, each map of the plurality of maps shares relationship data with each other map of the plurality of maps. In some implementations, the at least one regulated item is one of an alcoholic beverage, a smoking product, a drug, a restricted software product, a permit, and a banking request.

According to certain aspects of the present disclosure, a system for governing execution of a geography dependent computer process is provided. The system includes a memory comprising instructions. The system also includes one or more processors configured to execute the instructions to receive a target location comprising a geographic identifier. The processors are also configured to access a data store comprising a plurality of maps. Each map of the plurality of maps includes a plurality of geometric shapes and each geometric shape is associated with an execution rule. The processors are further configured to determine which geometric shape of the plurality of geometric shapes the geographic identifier is bounded within for at least two maps of the plurality of maps. The processors are also configured to generate an aggregate rule set based on each execution rule associated with each geometric shape determined to bound the geographic identifier. The processors are also configured to apply the aggregate rule set.

In some implementations, the geography dependent computer process includes one of an online transaction, an electronic media execution process, an electronic commerce transaction, and a software download transaction. In some implementations, the geography dependent computer process is an electronic commerce transaction. In some implementations, the instructions to apply the aggregate rule set includes instructions to determine, based on applying the aggregate rule set, whether execution of the geography dependent computer process is permissible In such implementations, the instructions to apply the aggregate rule set also includes instructions to execute, in response to determining execution of the geographic computer process is permissible, the geography dependent computer process. In some implementations, the one or more processors is further configured to execute the instructions to display, on a menu via a graphical user interface, at least one regulated item. In some implementations, the instructions to apply the aggregate rule set includes instructions to determine whether a purchase selection request of at least one regulated item is permissible based on the aggregate rule set In such implementations, the instruction to apply the aggregate rule set also includes instructions to add, based on determining the purchase selection request of the at least one regulated item is permissible, the at least one regulated item to an electronic shopping cart. In some implementations, the one or more processors is further configured to execute the instructions to determine, based on the aggregate rule set, whether purchase and delivery of at least one regulated item is permissible. In such implementations, the one or more processors is further configured to execute the instructions to permit, in response to determining that purchase and delivery of the at least one regulated item is permissible, purchase and delivery of the at least one regulated item to the target location via the e-commerce transaction. In some implementations, the one or more processors is further configured to execute the instructions to determine, based on applying the aggregate rule set, whether execution of the geography dependent computer process is permissible. In such implementations, the one or more processors is further configured to execute the instructions to restrict, in response to determining execution of the geographic computer process is impermissible, a regulated item from being displayed on a menu via a graphical user interface. In some implementations, the plurality of geometric shapes of each map corresponds to predetermined boundaries selected from one of state borders, county borders, city borders, zoning districts, and delivery zones. In some implementations, each geometric shape of the plurality of geometric shapes in a given map is non-overlapping. In some implementations, the one or more processors is further configured to execute the instructions to add, in the data store, a new map to the plurality of maps, wherein the new map comprises a plurality of geometric shapes that are associated with new execution rules that are distinct from execution rules associated with the plurality of maps existing in the data store. In some implementations, each map of the plurality of maps shares relationship data with each other map of the plurality of maps. In some implementations, the at least one regulated item is one of an alcoholic beverage, a smoking product, a drug, a restricted software product, a permit, and a banking request.

In yet another aspect, a non-transitory machine-readable storage medium includes machine-readable instructions for causing one or more processors to execute a method for governing execution of a geography dependent computer process is provided. The machine-readable instructions on the non-transitory machine-readable storage medium perform the method including receiving a target location comprising a geographic identifier. The machine-readable instructions further perform the method including accessing a data store comprising a plurality of maps. Each map of the plurality of maps includes a plurality of geometric shapes and each geometric shape is associated with an execution rule. The machine-readable instructions further perform the method including determining which geometric shape of the plurality of geometric shapes the geographic identifier is bounded within for at least two maps of the plurality of maps. The machine-readable instructions further perform the method including generating an aggregate rule set based on each execution rule associated with each geometric shape determined to bound the geographic identifier. The machine-readable instructions further perform the method including applying the aggregate rule set.

In some implementations, the geography dependent computer process comprises one of an online transaction, an electronic media execution process, an electronic commerce transaction, and a software download transaction. In some implementations, the geography dependent computer process is an electronic commerce transaction. In some implementations, the machine-readable instructions of applying the aggregate rule set includes determining, based on applying the aggregate rule set, whether execution of the geography dependent computer process is permissible. In such implementations, the machine-readable instructions of applying the aggregate rule set also includes executing, in response to determining execution of the geographic computer process is permissible, the geography dependent computer process.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

Figure 1:
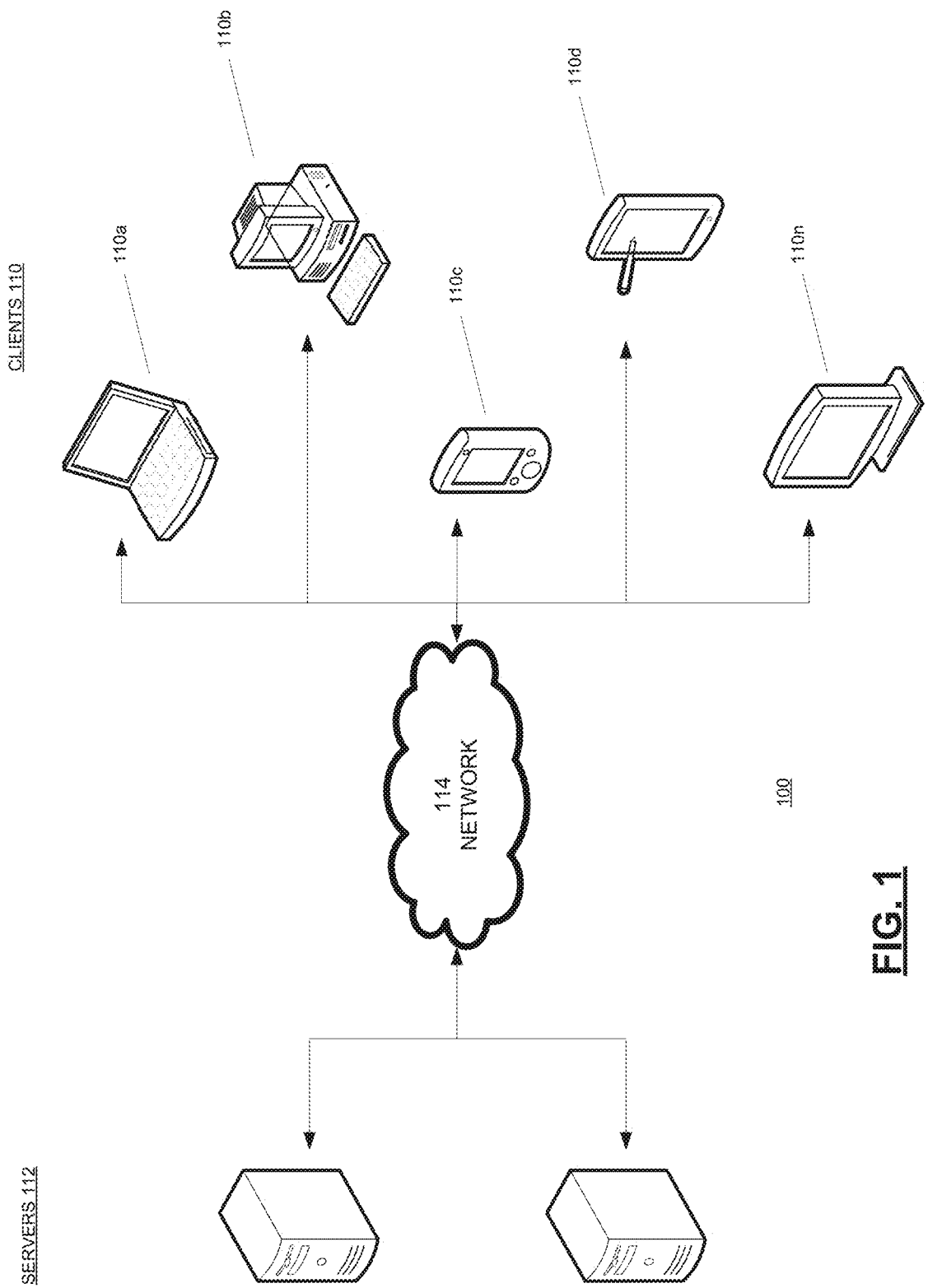
FIG. 1 illustrates an example architecture for governing execution of a geography dependent computer process.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art will realize, the described implementations may be modified in various different ways, all without departing from the scope of the present disclosure. Accordingly, the drawings and description are to be regarded as illustrative in nature and not restrictive.

The disclosed systems and methods provide for governing execution of a geography dependent process such as, for example, a computer process. The process can be, for example, but is not limited to, an online transaction, an electronic media execution process, an electronic commerce transaction, a software download transaction, and other well-known computerized processes. The systems and methods disclosed herein are used to identify or generate an aggregate rule set that applies to a geography dependent process based on a target location. Based on the generated aggregate rule set, the systems and methods can determine whether such a geography dependent process is permitted. If execution of the geography dependent process is not permitted, then the systems and methods, in some implementations, prevent execution of such process. For example, in response to determining that the specifically requested geography dependent process is not permitted, the systems and methods can restrict or omit a regulated item from being displayed on a menu for execution selection via a graphical user interface, or deny execution of a processing requested in violation of the aggregate rule set.

In order to determine or generate an applicable aggregate rule set, the systems and methods receive the target location or execution location such as, but not limited to, an address, global positioning system (GPS) coordinates, and other geographic identifiers or labels. After receiving the target location, the disclosed systems and methods query a plurality of maps with the target location. Each map of the plurality of maps is divided into a plurality of non-overlapping geometric shapes such that each non-overlapping geometric shape is associated with an execution rule. For example, each non-overlapping geometric shape can correspond to a jurisdictional boundary (e.g., state borders, county borders, city borders, zoning district boundaries) or to a more arbitrary boundary (e.g., delivery zones assigned to specific business locations, boundaries surrounding regions having common statistical characteristics). Each of the maps may cover overlapping, though not necessarily identical geographies. For example, one map of the plurality of maps cover a larger geographical area than another map. For example, one map may include shapes for a full country, whereas another map may only include shapes for counties with an individual state, or towns within one or more counties, but not an entire state. Similarly, one may define its geometric boundaries based on governmental jurisdictions or regulatory boundaries such that each of the non-overlapping geometric shapes is associated with a corresponding execution rule that can be set forth by the relevant corresponding governmental body. Another map of the plurality of maps, for example, can be divided by non-governmental entity boundaries such that each of its non-overlapping geometric shapes is associated with a corresponding execution rule that can be set forth by that non-governmental entity. The generated aggregate rule set includes the combination of the applicable execution rules (e.g., execution rules associated with the governmental jurisdictions and the non-governmental entity boundaries) associated with the geometric shapes for which the target location is bounded within.

As an example, the geography dependent process governed by the disclosed systems and methods can be the delivery of a regulated item, such as an alcoholic beverage, ordered through an electronic commerce (e-commerce) website. While the delivery of a regulated item is provided as an example, other geography dependent processes can be governed by the disclosed system and methods such as, but not limited to, electronic banking requests, electronic requests for permits, managing execution of software or electronic media based on license restrictions or government regulations, and other processes. In certain implementations, after receiving the target location, an execution platform (e.g., a server associated with a website) queries the plurality of maps with the target location to determine whether delivery of the regulated item is permitted to the target location. In such implementations, for example, if delivery of the regulated item is permitted to the target location, then the regulated item is displayed on the website via a graphical user interface for possible selecting by a user of the website for placement in an electronic shopping cart. On the other hand, if delivery is not permitted to the target location, then the regulated item is not displayed on a corresponding website. In certain other implementations, even if delivery is not permitted to the target location, the regulated item can be displayed on such a website, but is identified as being unselectable such that the user of the website is not permitted to select the regulated item for placement in the electronic shopping cart.

In certain other implementations, the regulated item is displayed on the website and the user of the website is permitted to select the regulated item for placement in the electronic shopping cart. In such implementations, after the regulated item is placed in the electronic shopping cart, upon checkout, the website queries the plurality of maps with the target location to determine whether the items in the electronic shopping cart, including the regulated item, are permitted for delivery to the target location. If delivery is permitted, then the order is allowed. If delivery is not permitted, then a message is displayed to the user of the website indicating the reason why the order is not allowed (e.g., the regulated item is not permitted for delivery to the target location).

In some instances, for example, the order may be refused because it is determined that the target location is in a location that prohibits delivery of the regulated item. In other instances, the order may be refused because it is determined that the target location is located in a jurisdiction that limits the volume or quantity of the regulated item that can be delivered and the electronic shopping cart includes an amount of the regulated item that exceeds the limit permitted for delivery.

In some implementations of the disclosed systems and methods, the plurality of maps are organized in an evaluation order to increase efficiency of determining or generating the applicable aggregate rule set. For example, the systems and methods can first search a delivery zone map to determine whether the target location is within an entity's delivery zone prior to searching maps with relevant regulatory boundaries, as a determination that the target location is not within the delivery zone would negate the need to further search any of the other maps.

In some implementations, disclosed systems and methods are configured to facilitate updates to the applicable rules by allowing the addition of one or more new maps that are each divided into a plurality of geometric shapes associated with execution rules that are different from the existing maps. Such updating to include new maps can be implemented without altering the existing maps or existing execution rules associated with the existing maps. Accordingly, the disclosed systems and methods provide technical benefits over prior systems and methods by allowing for greater flexibility and ease in updating systems without the system having to go off-line for updates. Similarly, maps can be removed from the system without the system going off-line if such maps become outdated.

The disclosed systems and methods also provide other technical benefits such as reducing the complexity of searches with respect to the target location as each map includes a single set of non-overlapping geometric shapes that are associated with execution rules. Thus each map only needs to be queried once.

FIG. 1 illustrates an example architecture 100 for governing execution of a geography dependent computer process. The architecture 100 includes one or more clients 110 and one or more servers 112 connected over a network 114.

The one or more clients 110, including, for example, clients 110a, 110b, 110c, 110d, . . . 110n, can be any suitable device such as, but not limited to, desktop computers, mobile computers, tablet computers (e.g., including e-book readers), mobile devices (e.g., a smartphone or PDA), desktop phones, set top boxes (e.g., for a television), video game consoles, and/or other devices having appropriate processor, memory, and communications capabilities for accessing resources on the network 114. Each client of the one or more clients 110 is configured to host a client application 210 (see FIG. 2).

The one or more servers 112 is configured to host a platform 212 (see FIG. 2), such as, for example, a platform for governing execution of a geography dependent computer process. For purposes of load balancing, a plurality of servers 112 may host the platform 212. The one or more servers 112 may be any device comprising an appropriate processor, memory, and communications capability for hosting the platform 212. In certain implementations, the one or more servers 112 can be a cloud computing server of an infrastructure-as-a-service (IaaS) and be able to support platform-as-a-service (PaaS) and software-as-a-service (SaaS) services.

The network 114 can include, for example, any one or more of a personal area network (PAN), a local area network (LAN), a campus area network (CAN), a metropolitan area network (MAN), a wide area network (WAN), a broadband network (BBN), the Internet, and the like. Further, the network 114 can include, but is not limited to, any one or more of the following network topologies, including a bus network, a star network, a ring network, a mesh network, a star-bus network, tree or hierarchical network, and the like. The network 114 may be wired or wireless.

Figure 2:
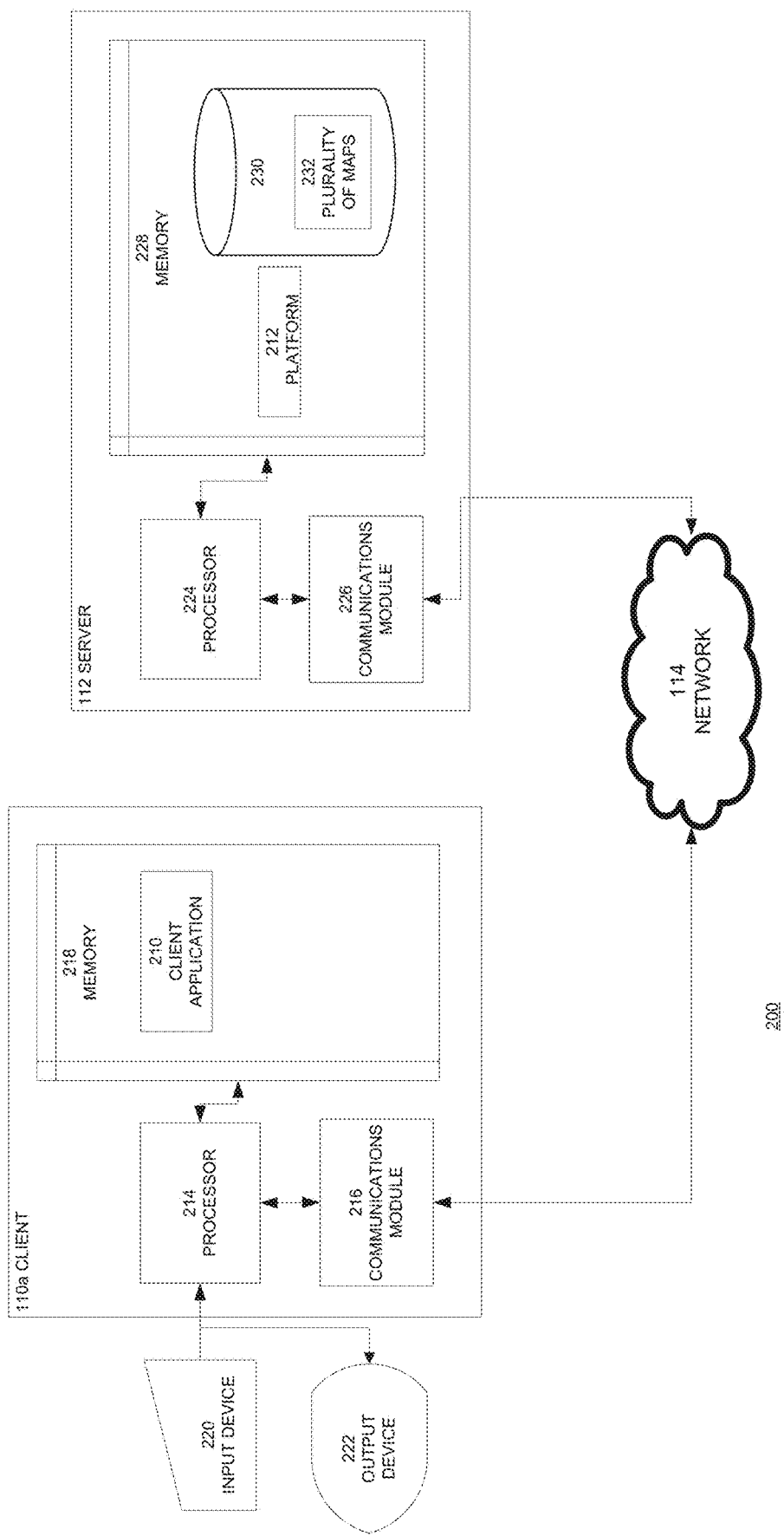
FIG. 2 illustrates example block diagrams of systems for governing execution of a geography dependent computer process according to some implementations.

FIG. 2 is a block diagram illustrating a system 200 for governing execution of a geography dependent computer process according to some implementations. The system 200 includes the one or more servers 112 and the one or more clients 110, such as the client 110a, shown in the architecture 100 of FIG. 1 according to some implementations of the disclosure. The one or more servers 112 and the client 110a are connected over the network 114.

The client 110a includes a processor 214, a communications module 216, and a memory 218 that includes the client application 210. The communications module 216 is configured to interface with the network 114 to transmit and receive information, such as data, requests, responses, and commands to and from other devices on the network 114. The communication module 216 can be, for example, a modem or Ethernet card, and/or another suitable communication hardware/software.

The client 110a also includes an input device 220, such as a keyboard, mouse, and/or another suitable input device, and an output device 222, such as a display, port, transducer, and/or another suitable output device. The processor 214 of the client 110a is configured to execute instructions, such as instructions physically coded into the processor 214, instruction received from software in the memory 218, instruction delivered from a remote memory, or a combination thereof. The processor 214 of the client 110a is configured to transmit information, such as data, requests, responses, and commands input to the input device 220, to the platform 212 associated with the one or more servers 112 via the client application 210. The application 210 may be, for example, an application for accessing an e-commerce website. In some implementations, the application may receive user input, such as a target location, via the input device 220. For example, the processor 214 of the client 110a can transmit the target location, which is received via the client application 210, to the platform 212 associated with the one or more servers 112. The processor 214 of the client 110a is similarly configured to receive such information from the platform 212 associated with the one or more servers 112 via the client application 210. In some implementations, the processor 214 of the client 110a can receive instructions from the platform 212 associated with the one or more servers 112 to display, on a menu via a graphical user interface (GUI), at least one regulated item in response to determining that execution of the geographic computer process is permissible. In some implementations, the processor 214 of the client 110a can receive instructions from the platform 212 associated with the one or more servers 112 to restrict the least one regulated item from being displayed on the menu in response to determining that execution of the geographic computer process is impermissible.

The one or more servers 112 includes a processor 224, a communications module 226, and a memory 228 that includes the platform 212 and a data store 230 including a plurality of maps 232. The communications module 226 is configured to interface with the network 114 to transmit and receive information, such as data, requests, responses, and commands to and from other devices on the network 114. The communication module 226 can be, for example, a modem or Ethernet card, and/or another suitable communication hardware/software.

The processor 224 of the one or more servers 112 is configured to execute instructions, such as instructions physically coded into the processor 224, instructions received from software in the memory 228, instructions delivered from a remote memory, or a combination thereof. The processor 224 of the one or more servers 112 is configured to receive user input, such as from the client 110a, for example, accessing the platform 212 over the network 114 using the client application 210. The processor 224 of the one or more servers 112 is configured to execute instructions from the platform 212 to receive the target location from the client 110a. The target location includes a geographic identifier such as, but not limited to, an address, a global positioning system coordinate, and other such geographic labels.

The processor 224 of the one or more servers 112 is also configured to execute instructions from the platform 212 to access the data store 230 including the plurality of maps 232. Each map of the plurality of maps 232 is divided into a plurality of non-overlapping geometric shapes, and each non-overlapping geometric shape is associated with an execution rule. Each non-overlapping geometric shape corresponds to a boundary. The boundary can be a jurisdictional boundary such as, but not limited to, a state border, a county border, a zoning district boundary, and other well-known jurisdictional boundaries. The boundary can also be an arbitrary boundary such as, but not limited to, a delivery zone assigned to a specific business location, a boundary surrounding regions having common statistical characteristics, and other such boundaries. In some implementations, each of the maps of the plurality of maps 232 covers overlapping, though not necessarily identical, geographies. For example, one map of the plurality of maps 232 can be divided by county borders such that each of the non-overlapping geometric shapes is associated with a corresponding execution rule that is set forth by the county associated with the geometric shape. Another map of the plurality of maps 232 can be divided by delivery zones such that each of its non-overlapping geometric shapes is associated with a corresponding execution rule that is dictated by a non-governmental entity associated with the delivery zones in one or more of the counties.

The processor 224 of the one or more servers 112 is also configured to execute instructions from the platform 212 to determine which geometric shape of the plurality of geometric shapes the geographic identifier is bounded within for at least two maps of the plurality of maps. The processor 224 of the one or more servers 112 is also configured to execute instructions from the platform 212 to generate an aggregate rule set based on each execution rule associated with each geometric shape determined to bound the geographic identifier. The processor 224 of the one or more servers 112 is also configured to execute instructions from the platform 212 to apply the aggregate rule set to the geography dependent computer process. The geography dependent computer process can be, but is not limited to, an online transaction, an electronic media execution process, an electronic commerce transaction, a software download process, and any other well-known process.

In some implementations, the processor 224 of the one or more servers 112 is configured to execute instructions from the platform 212 to, when applying the aggregate rule set, determine, based on applying the aggregate rule set, whether execution of the geography dependent computer process is permissible, and, in response to determining that the process is permissible, executing the process. In some implementations, the processor 224 of the one or more servers 112 is configured to execute instructions from the platform 212 to display at least one regulated item on a menu via the graphical user interface associated with the client 110*a*.

In some implementations, the processor 224 of the one or more servers 112 is configured to execute instructions from the platform 212 to, when applying the aggregate rule set, determine whether a purchase selection request of at least one regulated item is permissible based on the aggregate rule set, and, based on determining that the purchase selection request of the at least one regulated item is permissible, add the at least one regulated item to an electronic shopping cart.

In some implementations, the processor 224 of the one or more servers 112 is configured to execute instructions from the platform 212 to, determine, based on the aggregate rule set, whether purchase and delivery of the at least one regulated item is permissible, and, in response to determining that purchase and delivery of the at least one regulated item is permissible, permitting purchase and delivery of the at least one regulated item to the target location via the e-commerce transaction.

In some implementations, the processor 224 of the one or more servers 112 is configured to execute instructions from the platform 212 to, determine, based on the aggregate rule set, whether execution of the geography dependent computer process is permissible, and, in response to determining execution of the geographic computer process is impermissible, restricting the regulated item from being displayed on a menu via a graphical user interface.

In some implementations, the processor 224 of the one or more servers 112 is configured to execute instructions from the platform 212 to update the plurality of maps 232 with a new map. For example, the processor 224 of the one or more servers 112 is configured to execute instructions from the platform 212 to add, to the plurality of maps 232 in the data store 230, a distinct map that is divided into non-overlapping geometric shapes including distinct execution rules that may be different from the existing maps.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

Figure 3A:
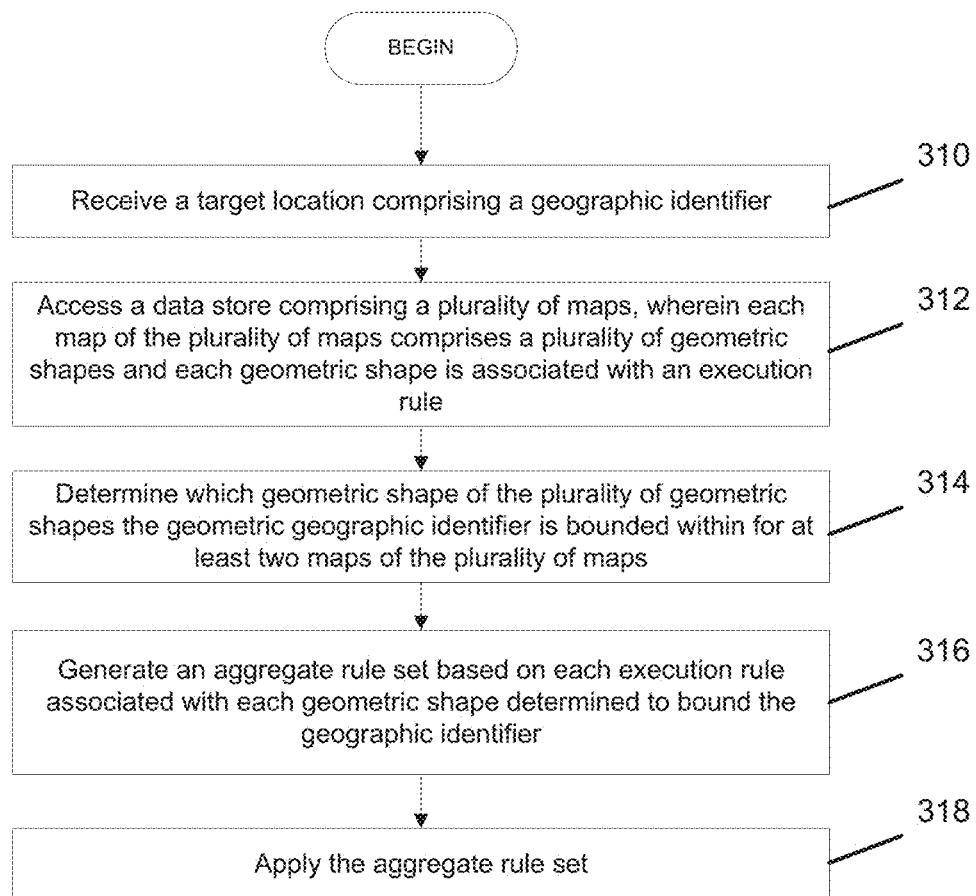
FIG. 3A is a flowchart showing a method for governing execution of a geography dependent computer process according to some implementations.

FIG. 3A illustrates an example process 300A for governing execution of a geography dependent computer process performed by the system 200 of FIG. 2. While FIG. 3A is described with reference to the example system 200 of FIG. 2, it should be noted that the process steps of FIG. 3A may be performed by other systems having more or fewer components as compared with the system 200 of FIG. 2 and may be executed in a different order.

The process 300A begins by proceeding to step 310 when the platform 212 receives the target location from the client 110*a*. The target location includes a geographic identifier informing the platform 212 of the location of the target location. At step 312, the platform 212 instructs the processor 224 of the one or more servers 112 to access the data store and queries the plurality of maps 232 stored in the data store 230. As discussed above, each map of the plurality of maps 232 includes a plurality of geometric shapes such that each geometric shape is associated with an execution rule. As illustrated at step 314, the platform 212 instructs the processor 224 of the one or more servers 112 to determine which of the geometric shapes of the plurality of geometric shapes the geometric identifier is bounded within for at least two maps of the plurality of maps 232.

The platform 212 instructs the processor 224 of the one or more servers 112, as illustrated at step 316, to generate the aggregate rule set based on each execution rule associated with each geometric shape that is determined to bound the geographic identifier. Accordingly, the aggregate rule set includes the combination of the execution rules that are associated with the geometric shapes that bound the geographic identifier for the corresponding maps. At step 318, the platform 212 instructs the processor 224 of the one or more servers 112 to apply the aggregate rule set to the geography dependent computer process.

Figure 3B:
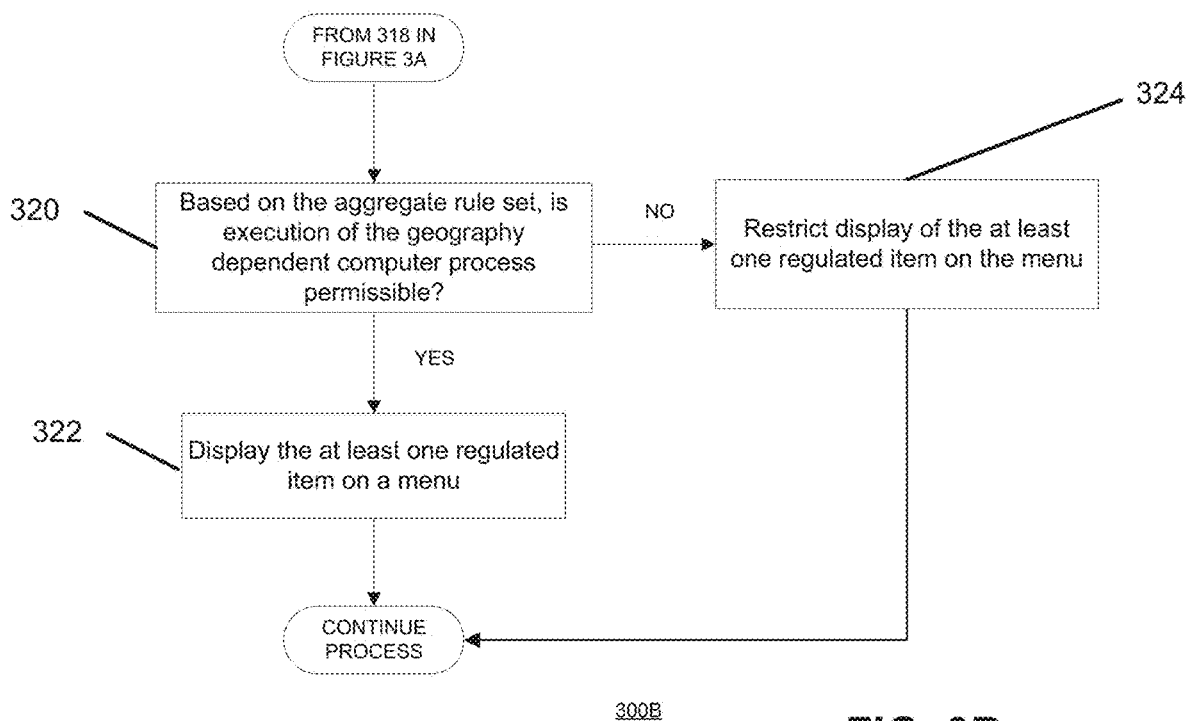
FIGS. 3B-3D are flowcharts showing further processes of FIG. 3A for governing execution of a geography dependent computer process according to some implementations.

FIG. 3B illustrates an example process 300B, which can continue from step 318 in FIG. 3A, for applying the aggregate rule set in an exemplarily implementation using the system 200 of FIG. 2. While FIG. 3B is described with reference to the example system 200 of FIG. 2, it should be noted that the process steps of FIG. 3B may be performed by other systems having more or fewer components as compared with the system 200 of FIG. 2.

The process 300B begins by proceeding to step 320 from step 318 of FIG. 3A when the platform 212 instructs the processor 224 of the one or more servers 112 to determine, based on applying the aggregate rule set, whether execution of the geography dependent computer process is permitted. If the processor 224 determines that execution of the geography dependent computer process is permitted, then the processor 224 executes the geography dependent computer process such that the platform 212 instructs the processor 224 of the one or more servers 112 to transmit instructs to the client 110*a* to display the at least one regulated item in the menu on the client 110*a*, as illustrated in step 322. Alternatively, in some implementations, if the processor 224 determines that execution of the geography dependent computer process is permitted, then the platform 212 instructs the processor 224 of the one or more servers 112 to transmit the menu with the at least one regulated item to the client 110*a* for display. On the other hand, in some implementations, if the processor 224 determines that execution of the geography dependent computer process is not permitted, then the processor 224 transmits instructions to the client 110*a* to restrict the regulated item from being displayed on the menu on the client 110*a*, as depicted in step 324. Alternatively, in some implementations, if the processor 224 determines that execution of the geography dependent computer process is not permitted, then the processor 224 transmits the menu without the at least one regulated item to the client 110*a* for display.

Figure 3C:
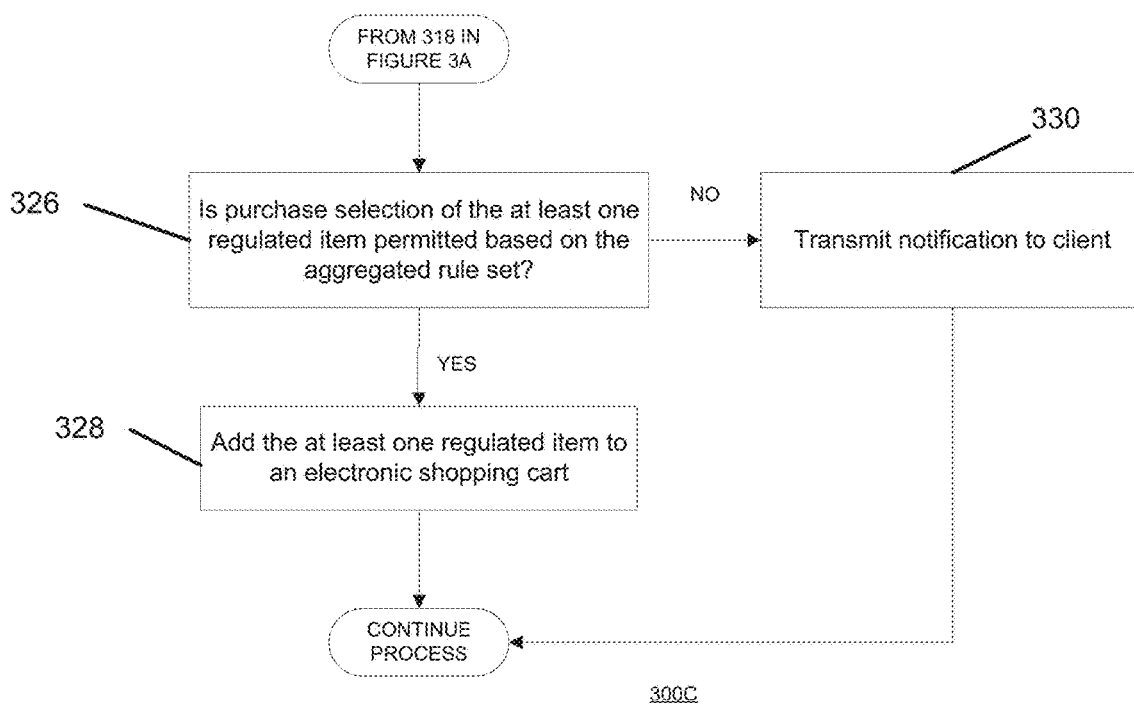

FIG. 3C illustrates an example process 300C, which can continue from step 318 in FIG. 3A, for applying the aggregate rule set in an exemplarily implementation using the system 200 of FIG. 2. While FIG. 3C is described with reference to the example system 200 of FIG. 2, it should be noted that the process steps of FIG. 3C may be performed by other systems having more or fewer components as compared with the system 200 of FIG. 2.

The process 300C begins by proceeding to step 326 from step 318 of FIG. 3A when, after the at least one regulated item has been displayed on the menu, the platform 212 instructs the processor 224 of the one or more servers 112 to determine whether a purchase selection request of the at least one regulated item is permissible based on the aggregate rule set. If the processor 224 determines that the purchase selection request of the at least one regulated item is permitted based on the aggregate rule set, then the platform 212 instructs the processor 224 of the one or more servers 112 to add the at least one regulated item to the electronic shopping cart, as depicted at step 328. If the processor 224 determines that the purchase of the at least one regulated item is not permitted, then the platform 212 instructs the processor 224 of the one or more servers 112 to transmit a notification to the client 110*a* indicating that the at least one regulated item cannot be added to the electronic shopping cart, as depicted in step 330. For example, based on the aggregate rule set, the processor 224 may determine that purchase of the at least one regulated item is not permitted because a delivery time no longer complies with the aggregate rule set.

Figure 3D:
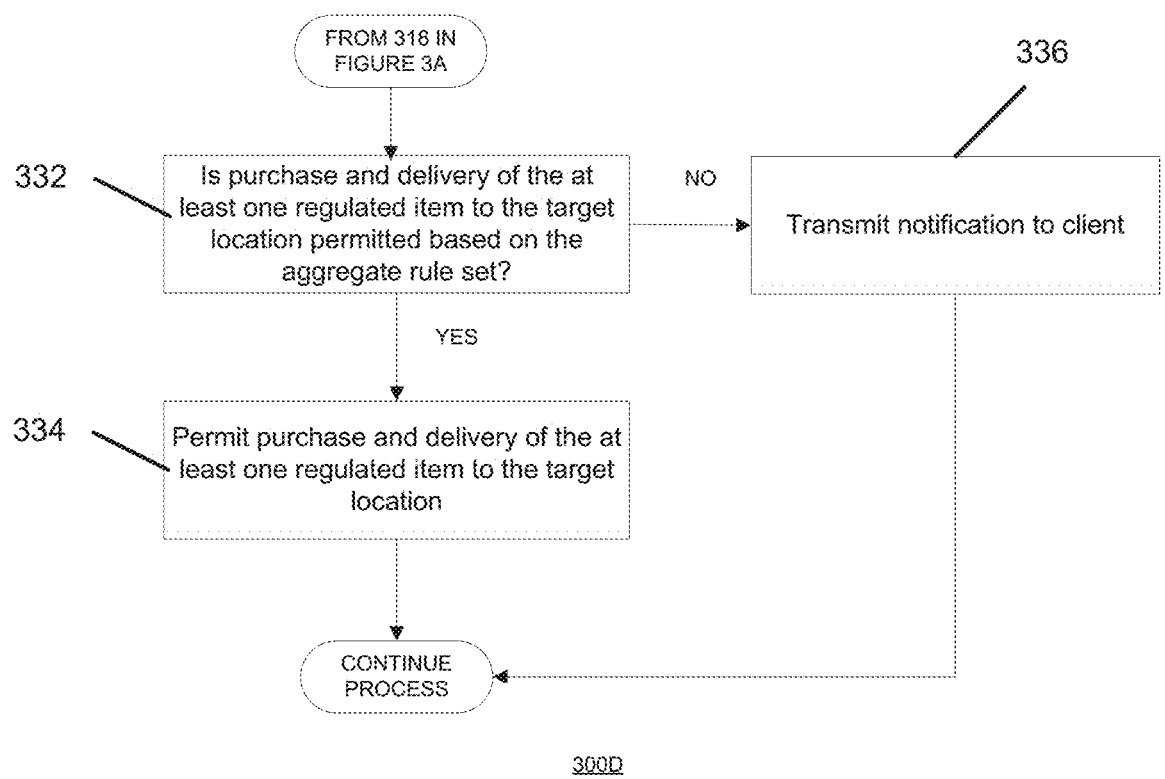

FIG. 3D illustrates an example process 300D, which can continue from step 318 in FIG. 3A, for applying the aggregate rule set in an exemplarily implementation using the system 200 of FIG. 2. While FIG. 3D is described with reference to the example system 200 of FIG. 2, it should be noted that the process steps of FIG. 3D may be performed by other systems having more or fewer components as compared with the system 200 of FIG. 2.

The process 300D begins by proceeding to step 332 from step 318 of FIG. 3A when, after the at least one regulated item is placed in the shopping cart, e.g., after receipt of a "check-out" request, the platform 212 instructs the processor 224 of the one or more servers 112 to determine whether purchase and delivery of the at least one regulated item to the target location is permitted based on the aggregate rule set. If the processor 224 determines that purchase and delivery of the at least one regulated item to the target location is permitted based on the aggregate rule set, then the platform 212 instructs the processor 224 of the one or more servers 112 to permit purchase and delivery of the at least one regulated item to the target location, as depicted in step 334. If the processor 224 determines, on the other hand, that purchase and delivery of the at least one regulated item to the target location is not permitted based on the aggregate rule set, then the platform 212 instructs the processor 224 of the one or more servers 112 to transmit a notification to the client 110*a* indicating that the at least one regulated item cannot be purchased, as depicted in step 336. For example, after the at least one regulated item is placed in the shopping cart, either individually or in combination with other non-regulated items displayed on the menu, if the processor 224 determines that another regulated item is subsequently added to the shopping cart such that the total amount of all the regulated items in the shopping cart exceeds a threshold amount of permitted regulated items, then the platform instructs the processor 224 to transmit a notification to the client 110*a* indicating that purchase and delivery of the at least one regulated item to the target location is not permitted.

Figure 4A:
FIGS. 4A-4C collectively illustrate a plurality of maps in which a target location is bound in accordance to some implementations of the example processes of FIGS. 3A-3D.
Figure 4B:
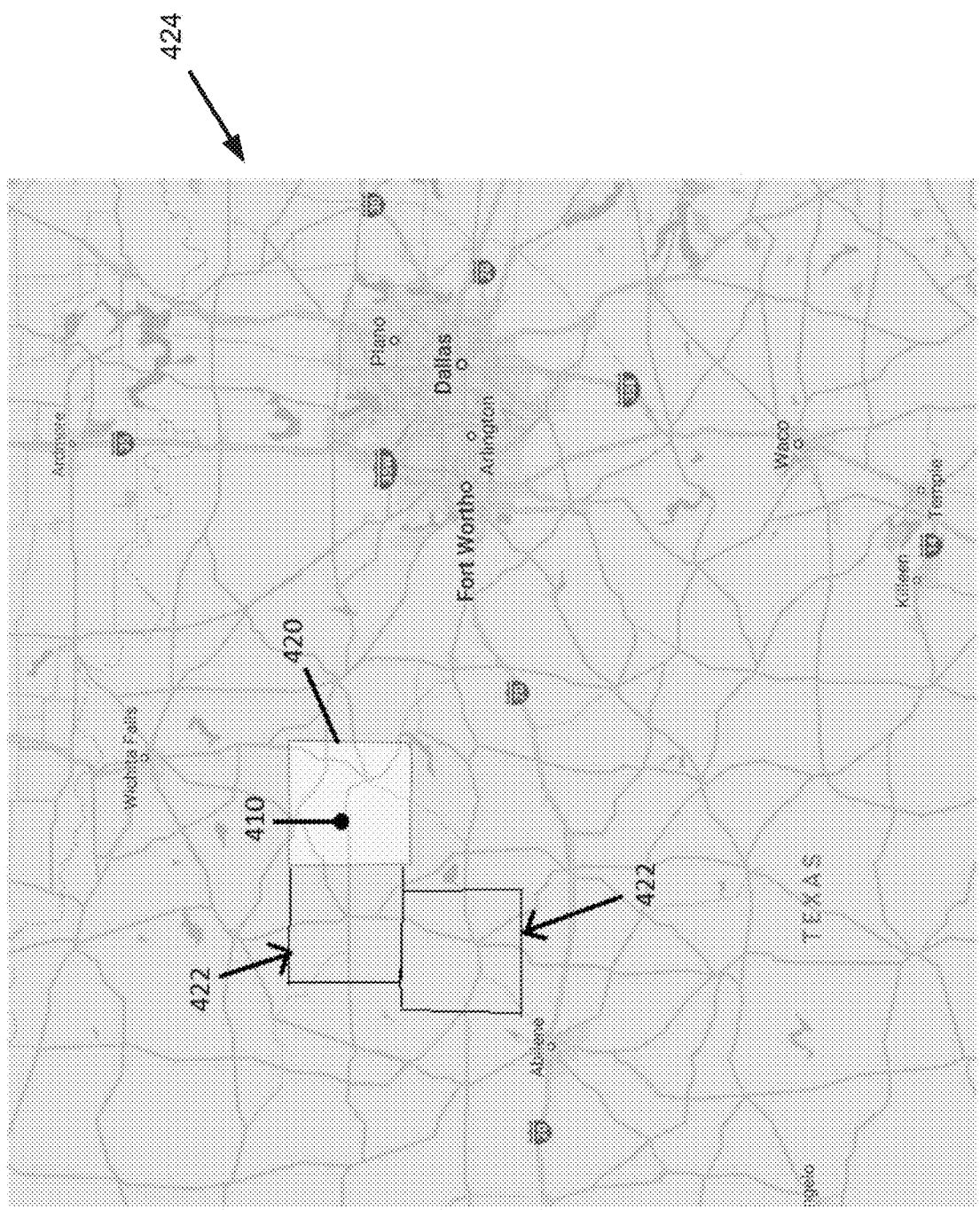
Figure 4C:
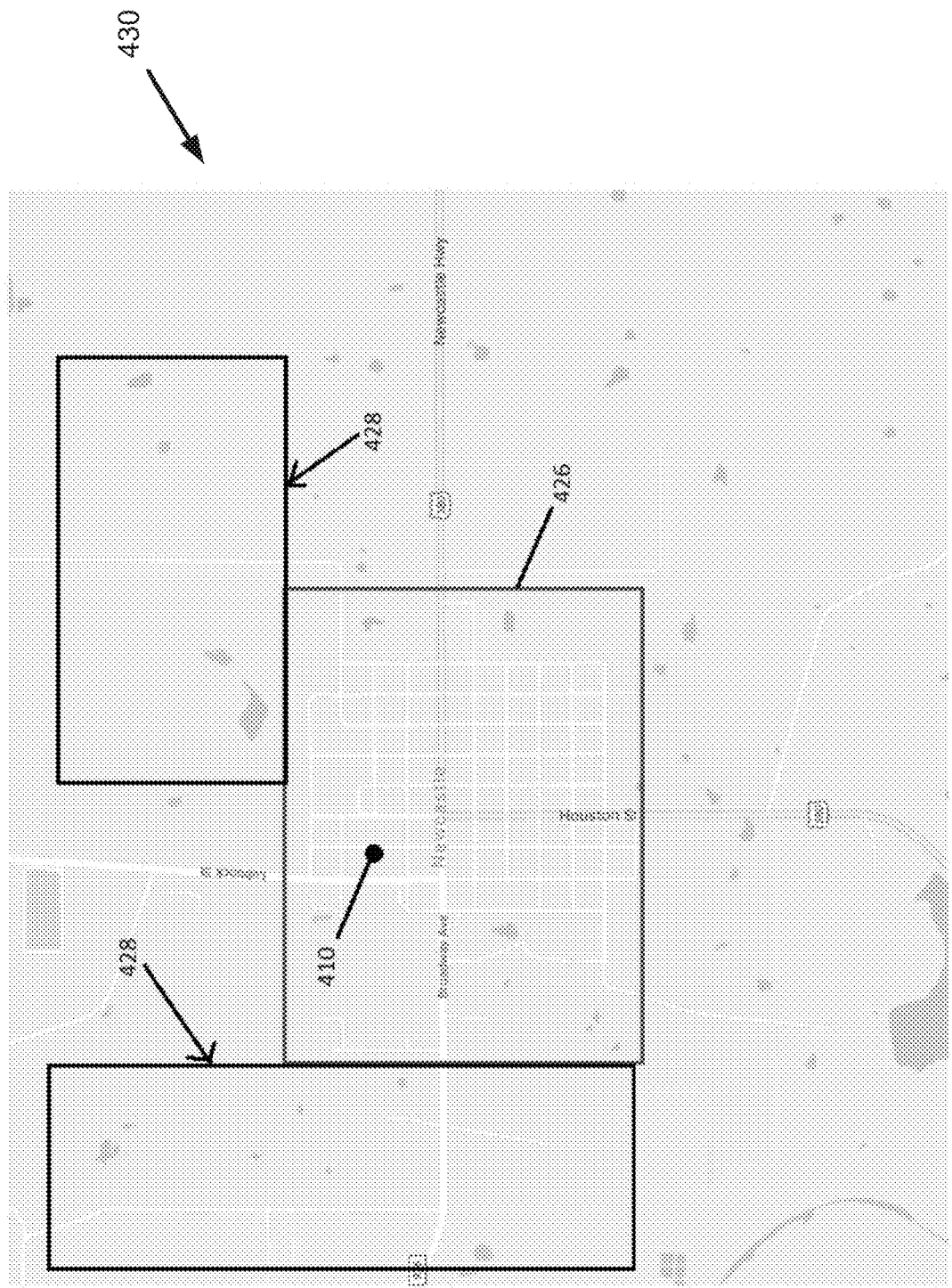

FIGS. 4A-4C collectively illustrate a plurality of maps 232, which the processor 224 queries with the target location 410 according to some implementations. FIG. 4A exemplarily depicts the target location 410 determined to be bounded within a first geometric shape 412 of a first plurality of geometric shapes 414 of a first map 416 of the plurality of maps 232. FIG. 4B exemplarily depicts the target location 410 determined to be bounded within a second geometric shape 420 of a second plurality of geometric shapes 422 of a second map 424 of the plurality of maps 232. FIG. 4C exemplarily depicts the target location 410 determined to be bounded within a third geometric 426 of a third plurality of geometric shapes 428 of a third map 430 of the plurality of maps 232.

For example, the target location 410 includes the geographic identifier identifying the address of the target location 410. The first map 416 of the plurality of maps 232 is divided into the first plurality of geometric shapes 414 including the first geometric shape 412, which bounds the target location 410. As shown in FIG. 4A, the first map 416 is divided into the first plurality of geometric shapes 414 of the states of the United States of America. The first geometric shape 412 bounding the target location 410 is the state of Texas. As an example, the first geometric shape 412 is associated with an execution rule that allows beer delivery and allows delivery before 11 PM. The second map 424 of the plurality of maps 232 is divided into the second plurality of geometric shapes 422 including the second geometric shape 420, which also bounds the target location 410. In this example, the second map 424 is a county map such that the second plurality of geometric shapes 422 depict the counties of the state of Texas. The target location 410 is bounded within the second geometric shape 420, which depicts the boundaries of Young County Texas. The second geometric shape 420 is associated with an execution rule governed by Young County Texas, which, for example, permits beer delivery of a maximum of 12 bottles or cans, and does not permit delivery of hard liquor. The third map 430 of the plurality of maps 232 is divided into the third plurality of geometric shapes 428 including the third geometric shape 426, which also bounds the target location 410. In this example, the third map 430 is a delivery zone map dictated by an entity. The target location 410 is bounded within the third geometric shape 426, which is associated with an execution rule that permits delivery of alcoholic beverages to locations within the third geometric shape 426 only before 10 PM.

Figure 5A:
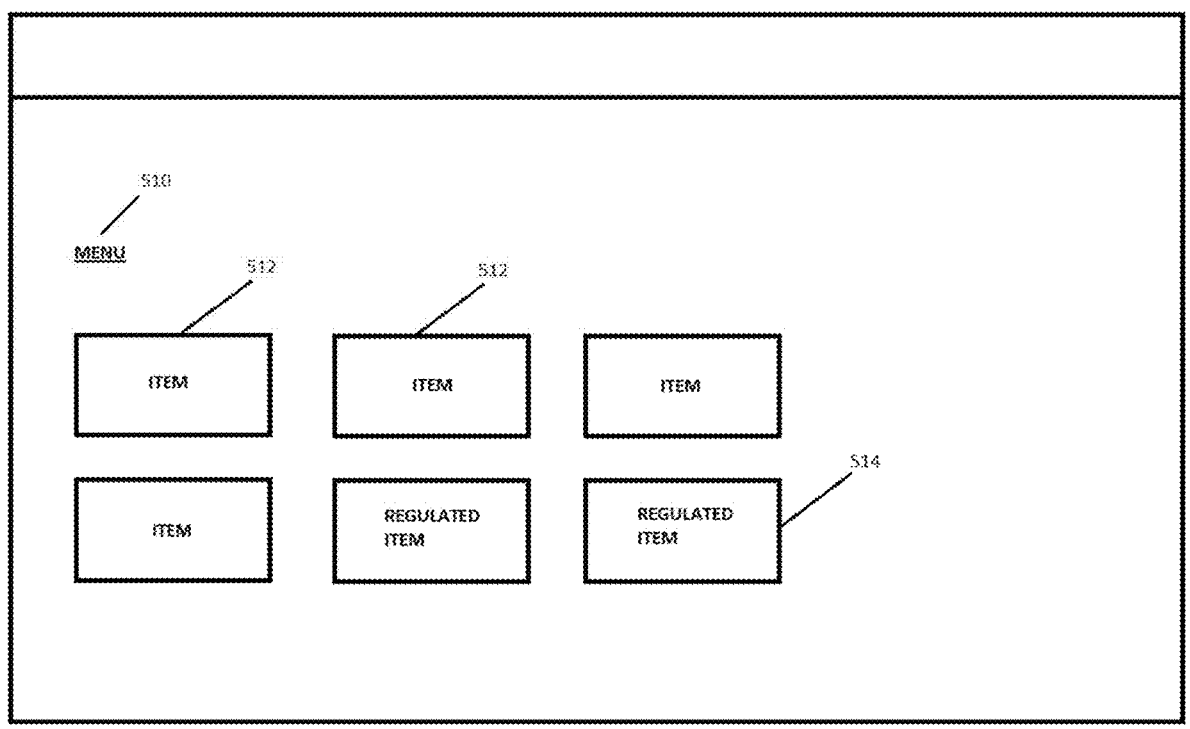
FIGS. 5A-5D illustrate example user interfaces associated with methods and systems for governing execution of a geography dependent computer process according to some implementations.
Figure 5B:
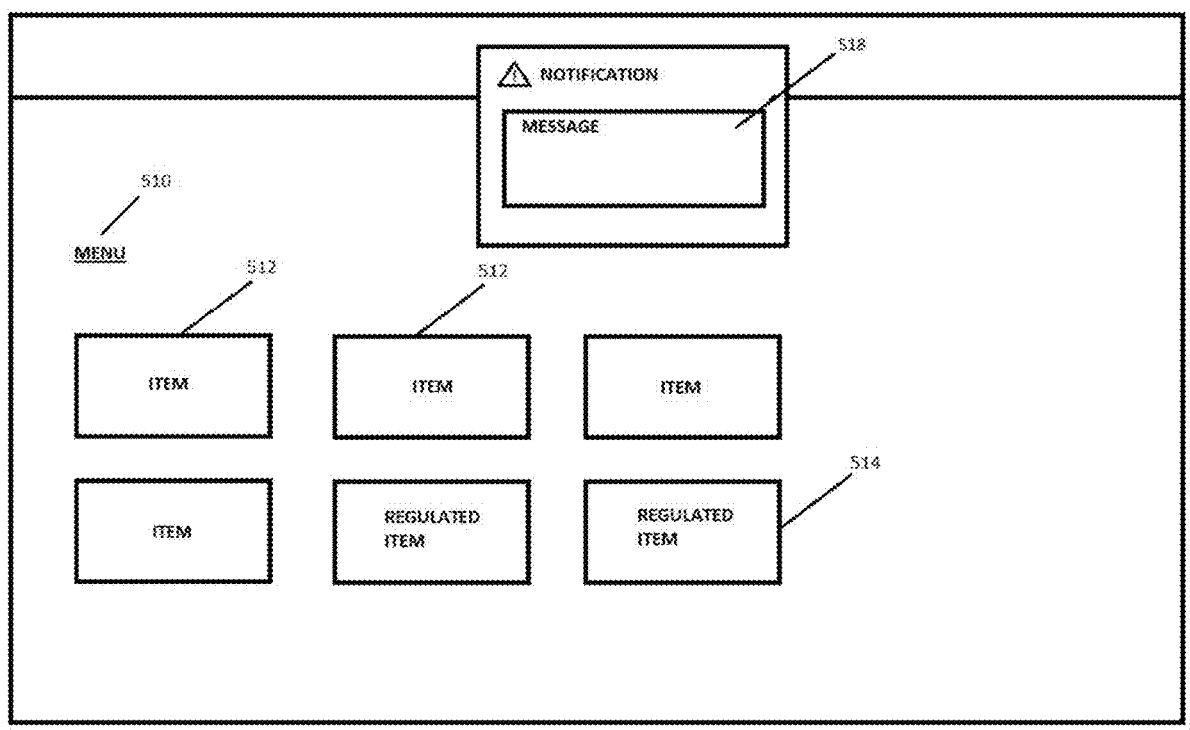
Figure 5C:
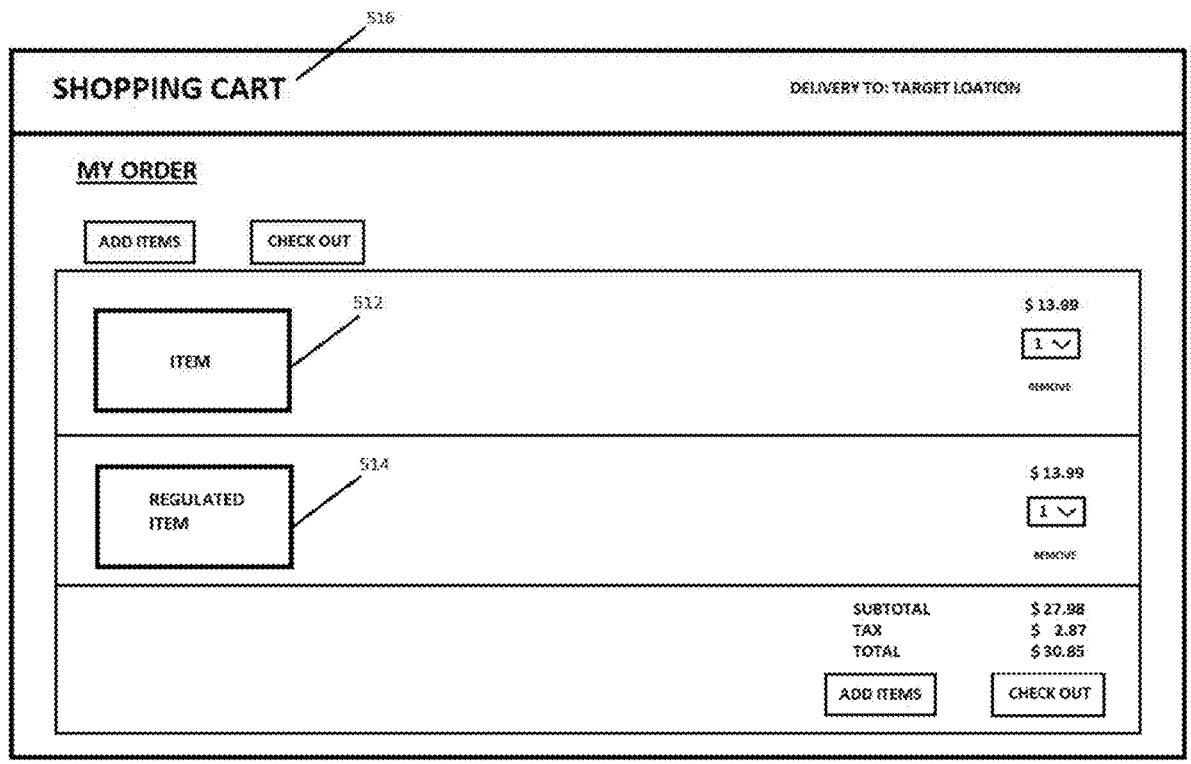
Figure 5D:
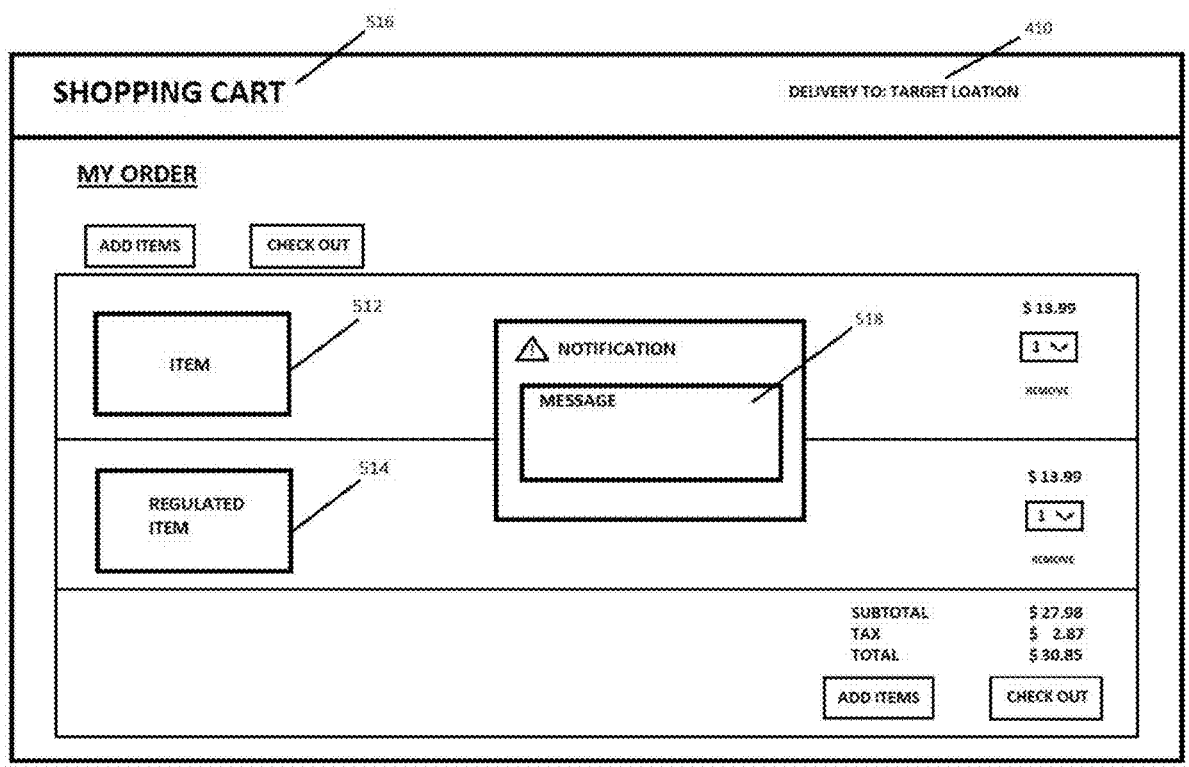

FIGS. 5A-5D illustrate example graphical user interfaces displayed on the client 110a in accordance with some implementations of the disclosed systems and methods. FIG. 5A illustrates the menu 510, which can be displayed on the client 110a via the graphical user interface. The menu 510 can display a plurality of items 512 including the at least one regulated item 514. FIG. 5B illustrates a notification 518 with an error message displayed with the menu 510. FIG. 5C illustrates the electronic shopping cart 516, which can be displayed on the client 110a via the graphical user interface. FIG. 5D illustrates the notification 518 with an error message displayed with the electronic shopping cart 516. An example will now be described with respect to the examples illustrated in FIGS. 4A-5D along with the example processes 300A to 300D depicted respectively in FIGS. 3A to 3D.

For example, in some implementations, the processor 224 of the one or more servers 112 receives a target location 410 from the client 110a. The processor 224 accesses the data store 230 and queries the plurality of maps 232 stored in the data store 230 with the target location 410 received from the client 110a. For example, with reference to FIG. 4A, the processor 224 determines that the target location 410 is bounded within the first geometric shape 412 of the first map 416, which is associated with the execution rule that allows delivery of beer (e.g., the at least one regulated item 514) and allows delivery before 11 PM to the target location 410. The processor 224 then continues to query the plurality of maps 232 and determines that the target location 410 is also bounded within the second geometric shape 420 of the second map 424, which is associated with the execution rule that permits beer delivery of a maximum of 12 bottles or cans, and does not permit delivery of hard liquor. It should be noted that if the processor 224, however, had determined when querying the first map 416 that beer delivery to the target location 410 was not permitted, then the processor 224 would not query the second map 424. Having determined that delivery to the target location 410 is permitted based on the executions rules associated with both the first geometric shape 412 and the second geometric shape 420, the processor 224 next queries the third map 430 and determines that the target location is bounded within the third geometric shape 426, which is associated with the execution rule that permits delivery of alcoholic beverages to locations within the third geometric shape 426 before 10 PM.

The processor 224 then generates the aggregate rule set based on each of the execution rules associated with the first geometric shape 412, the second geometric shape 420, and the third geometric shape 426. In this example, the aggregate rule set indicates that beer delivery is permitted to the target location 410 before 10 PM, the amount of beer is limited to 12 bottles or cans of beer, and hard liquor is not permitted for delivery to the target location 410. Even though the execution rule associated with the first geometric shape 412 allows delivery before 11 PM, the aggregate rule set only allows delivery before 10 PM based on the execution rule associated with the third geometric shape 426. Relationship data shared between each map of the plurality of maps 232 allows, for example, the execution rule associated with the third geometric shape 426 to override the execution rule associated with the first geometric shape 412. Although in this example, the execution rule associated with the third geometric shape 426 overrides the execution rule associated with the first geometric shape 412, it should be understood that the hierarchy for applicability of the execution rules associated with the geometric shapes of the maps are predetermined but can also can be modified over time. Based on the aggregate rule set, the processor 224 determines that display of the at least one regulated item 514 is permitted and instructs the client 110a to display the at least one regulated item 514 on the menu 510, as depicted in FIG. 5A. In some implementations, the at least one regulated item 514 would be restricted from being displayed on the menu 510 if the processor 224 determined, for example, that the aggregate rule set prohibits delivery of the at least one regulated item 514 to the target location 410 (e.g., the target location 410 is instead bounded within a dry county).

As illustrated in FIG. 5A, the menu 510 displays the plurality of items 512 including the at least one regulated item 514. In some implementations, if the at least one regulated item 514 is selected for purchase, the processor 224 will determine if purchase selection is permitted based on the aggregate rule set. In such implementations, if the processor 224 determines that purchase selection of the at least one regulated item 514 is permitted, then the processor 224 adds the at least one regulated item to the electronic shopping cart 516, as depicted in FIG. 5C, and if the processor 224 determines that purchase selection of the at least one regulated item 514 is not permitted, then the processor 224 transmits the notification 518 to the client 110a, as illustrated in FIG. 5B. In other implementations, if the at least one regulated item 514 is selected for purchase and placed in the electronic shopping cart 516, the processor 224 will determine whether purchase and delivery of the at least one regulated item 514 is permitted to the target location 410 based on the aggregate rule set. If the processor 224 determines that purchase and delivery is permitted to the target location 410, then the processor 224 will permit purchase and delivery of the at least one regulated item 514 to the target location 410. On the other hand, if the processor 224 determines that purchase and/or delivery is not permitted to the target location 410, then the processor 224 sends the notification message 518 to the client 110a for display, as illustrated in FIG. 5D. The message 518 can indicate that purchase and/or delivery of the at least one regulated item is prohibited for violating the aggregate rule set. In some implementations, the processor 224 will also perform an age verification before adding the at least one regulated item 514 to the electronic shopping cart 516. The processor 224 will then permit purchase and delivery of the at least one regulated item 514 after it determines that the purchase and delivery of the at least one regulated item 514 is permitted and all verifications are valid.

While the above example is described with respect to the geography dependent process being an electronic commerce transaction, the geography dependent process can be any well-known computerized process such as, but not limited to, an electronic media execution process based on license restrictions (digital rights management) or governmental regulations, an electronic banking request based on banking regulations and bank policies, an online transaction based on vendor policies and rules of various overlapping governing jurisdictions, an electronic permitting request, and a software download process, for example restricted by export control laws. For example, the geography dependent process can be the electronic media execution process based on license restrictions dictated by an entity. In this example, the plurality of maps 232 includes a map divided by geometric shapes that indicate geographic locations for which the electronic media process can be executed (e.g., streaming a sporting event). If the processor 224 determines that the target location 410 is bounded by a geometric shape that does not allow for the electronic media process to be executed, then application of the corresponding aggregate rule set restricts the electronic media process from being executed within the target location 410. For example, the media will not be streamed to requesting device.

As another example, the geography dependent process can be the software download process. In this example, the plurality of maps 232 includes a map divided by geometric shapes that are governed by regulations related to export control laws. If the processor 224 determines that the target location 410 is bounded by a geometric shape that is regulated by certain download export limitations, for example a location to which software including enhanced encryption functionality is prohibited, then application of the corresponding aggregate rule set restricts downloading of the software to the target location 410.

Figure 6:
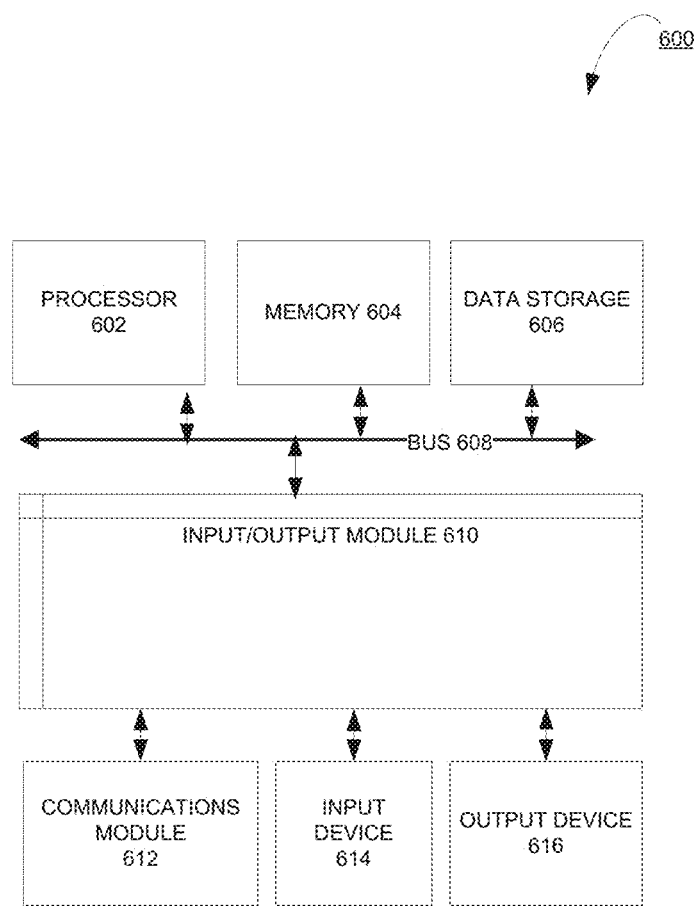
FIG. 6 is a block diagram of an example computer system.

FIG. 6 is a block diagram illustrating an example computer system 600 with which the one or more servers 112 and the one or more clients 110 of FIG. 1 can be implemented. In certain aspects, the computer system 600 may be implemented using hardware or a combination of software and hardware, either in a dedicated server, integrated into another computing component, or distributed across multiple computing components.

Computer system 600 (e.g., the one or more servers 112 and the one or more clients 110) may include a bus 608 and/or another suitable communication mechanism for communicating information, and one or more processors 602 (e.g., processor 214, processor 224) coupled with the bus 608 for processing information. According to one aspect, the computer system 600 can be a cloud computing server of an IaaS that is able to support PaaS and SaaS services. According to an example embodiment, the computer system 600 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 600 may be implemented with the one or more processors 602. The one or more processors 602 may comprise a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

The computer system 600 may include, in addition to hardware, code that creates an execution environment for the computer program in question, e.g., code that constitutes processor firmware, a protocol stack, a data store management system, an operating system, or a combination of one or more of them stored in an included memory 604 (e.g., memory 218, memory 228), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 608 for storing information and instructions to be executed by the one or more processors 602. The processor(s) 602 and the memory 604 can be supplemented by, or incorporated in, special purpose logic circuitry. Expansion memory may also be provided and connected to computer system 600 through input/output module 610, which may include, for example, a SIMM (Single In Line Memory Module) card interface. Such expansion memory may provide extra storage space for computer system 600, or may also store applications or other information for computer system 600. Specifically, expansion memory may include instructions to carry out or supplement the processes described above, and may further include secure information. Thus, for example, expansion memory may be provided as a security module for computer system 600, and may be programmed with instructions that permit secure use of computer system 600. In addition, secure applications may be provided via the SIMM cards, along with additional information, such as placing identifying information on the SIMM card in a non-hackable manner.

The instructions may be stored in the memory 604 and implemented in one or more computer program products, e.g., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 604 may also be used for storing temporary variables or other intermediate information during execution of instructions to be executed by the processor(s) 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with the processor(s) 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. The communications modules 612 (e.g., communications module 216, communications module 226) may comprise networking interface cards, such as Ethernet cards and/or modems.

The components of the system can be interconnected by any form or medium of digital data communication, e.g., a communication network. The communication network (e.g., the network 114) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 612 sends and receives electrical, electromagnetic or optical signals that carry digital data streams representing various types of information. The network link typically provides data communication through one or more networks to other data devices. For example, the network link of the communications module 612 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through the communications module 612, which carry the digital data to and from the computer system 500, are example forms of transmission media.

The computer system 600 can send messages and receive data, including program code, through the network(s), the network link and communications module 612. In the Internet example, a server might transmit a requested code for an application program through the Internet, the ISP, the local network, and the communications module 612. The received code may be executed by the processor(s) 602 as it is received, and/or stored in the data storage device 606 for later execution.

In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device.

According to one aspect of the present disclosure, the one or more servers 112 and the one or more clients 110 can be implemented using the computer system 600 in response to the processor(s) 602 executing one or more sequences of one or more instructions contained in the memory 604. Such instructions may be read into the memory 604 from another machine-readable medium, such as the data storage device 606. Execution of the sequences of instructions contained in the memory 604 causes the processor(s) 602 to perform the process steps described herein. One or more processors in a multi-processing arrangement may also be employed to execute the sequences of instructions contained in the memory 604. The processor(s) 602 may process the executable instructions and/or data structures by remotely accessing the computer program product, for example by downloading the executable instructions and/or data structures from a remote server through the communications module 612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a data store server in the cloud-computing environment, or may be downloaded to a private storage device from the cloud-computing environment.

As mentioned hereinabove, the computing system 600 may include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 606. Volatile media include dynamic memory, such as the memory 604. Transmission media include coaxial cables, copper wire, and fiber optics, including the wires that include the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for governing execution of a geography dependent computer process, the method comprising:
   receiving from a computing device of a user, at a server, a request to be processed by a geography dependent process executing on the server;
   receiving a target location comprising a geographic identifier from the user's computing device;
   accessing, by the server, a data store comprising a plurality of maps, wherein each map of the plurality of maps comprises a plurality of geometric shapes and each geometric shape is associated with an execution rule;
   determining, by the server, which geometric shape of the plurality of geometric shapes the geographic identifier of the target location is bounded within for at least two maps of the plurality of maps;
   generating, by the server, an aggregate rule set based on each execution rule associated with each geometric shape determined to bound the geographic identifier; identifier of the target location; and
   applying, by the server, the aggregate rule set within the geography dependent computer process to process the request.

2. The computer-implemented method of claim 1, wherein the geography dependent computer process comprises one of an online transaction, an electronic media execution process, an electronic commerce transaction, and a software download process.

3. The computer-implemented method of claim 2, wherein the geography dependent computer process is an electronic commerce transaction.

4. The computer-implemented method of claim 3, wherein applying the aggregate rule set comprises:
   determining, based on applying the aggregate rule set, whether execution of the geography dependent computer process is permissible; and
   executing, in response to determining execution of the geographic computer process is permissible, the geography dependent computer process.

5. The computer-implemented method of claim 4, wherein executing the geography dependent computer process further comprises:
   displaying, on a menu via a graphical user interface of the user's computing device, at least one regulated item.

6. The computer-implemented method of claim 4, wherein applying the aggregate rule set comprises:
   determining whether a purchase selection request of at least one regulated item is permissible based on the aggregate rule set; and
   adding, based on determining the purchase selection request of the at least one regulated item is permissible, the at least one regulated item to an electronic shopping cart.

7. The computer-implemented method of claim 3, further comprising:
   determining, based on the aggregate rule set, whether purchase and delivery of at least one regulated item is permissible; and
   permitting, in response to determining that purchase and delivery of the at least one regulated item is permissible, purchase and delivery of the at least one regulated item to the target location via the e-commerce transaction.

8. The computer-implemented method of claim 3, further comprising:
   determining, based on applying the aggregate rule set, whether execution of the geography dependent computer process is permissible; and
   restricting, in response to determining execution of the geographic computer process is impermissible, a regulated item from being displayed on a menu via a graphical user interface of the user's computing device.

9. The computer-implemented method of claim 1, wherein the plurality of geometric shapes of each map corresponds to predetermined boundaries selected from one of state borders, county borders, city borders, zoning districts, and delivery zones.

10. The computer-implemented method of claim 1, wherein each geometric shape of the plurality of geometric shapes in a given map is non-overlapping.

11. The computer-implemented method of claim 1, further comprising:
adding, in the data store, a new map to the plurality of maps, wherein the new map comprises a plurality of geometric shapes that are associated with new execution rules that are distinct from execution rules associated with the plurality of maps existing in the data store.

12. The computer-implemented method of claim 1, wherein each map of the plurality of maps shares relationship data with each other map of the plurality of maps.

13. The computer-implemented method of claim 5, wherein the at least one regulated item is one of an alcoholic beverage, a smoking product, a drug, a restricted software product, a permit, and a banking request.

14. A system for governing execution of a geography dependent computer process, the system comprising:
a memory comprising instructions; and
one or more processors configured to execute the instructions to:
receive from a computing device of a user, at a server, a request to be processed by a geography dependent process executing on the server;
receive a target location comprising a geographic identifier from the user's computing device;
access, by the server, a data store comprising a plurality of maps, wherein each map of the plurality of maps comprises a plurality of geometric shapes and each geometric shape is associated with an execution rule;
determine, by the server, which geometric shape of the plurality of geometric shapes the geographic identifier of the target location is bounded within for at least two maps of the plurality of maps;
generate, by the server, an aggregate rule set based on each execution rule associated with each geometric shape determined to bound the geographic identifier; and
apply, by the server, the aggregate rule set within the geography dependent computer process to process the request.

15. The system of claim 14, wherein the geography dependent computer process comprises one of an online transaction, an electronic media execution process, an electronic commerce transaction, and a software download transaction.

16. The system of claim 15, wherein the geography dependent computer process is an electronic commerce transaction.

17. The system of claim 16, wherein the instructions to apply the aggregate rule set comprises:
determine, based on applying the aggregate rule set, whether execution of the geography dependent computer process is permissible; and
execute, in response to determining execution of the geographic computer process is permissible, the geography dependent computer process.

18. The system of claim 17, wherein the one or more processors is further configured to execute the instructions to:
display, on a menu via a graphical user interface of the user's computing device, at least one regulated item.

19. The system of claim 17, wherein the instructions to apply the aggregate rule set comprises:
determine whether a purchase selection request of at least one regulated item is permissible based on the aggregate rule set; and
add, based on determining the purchase selection request of the at least one regulated item is permissible, the at least one regulated item to an electronic shopping cart.

20. The system of claim 16, wherein the one or more processors is further configured to execute the instructions to:
determine, based on the aggregate rule set, whether purchase and delivery of at least one regulated item is permissible; and
permit, in response to determining that purchase and delivery of the at least one regulated item is permissible, purchase and delivery of the at least one regulated item to the target location via the e-commerce transaction.

21. The system of claim 16, wherein the one or more processors is further configured to execute the instructions to:
determine, based on applying the aggregate rule set, whether execution of the geography dependent computer process is permissible; and
restrict, in response to determining execution of the geographic computer process is impermissible, a regulated item from being displayed on a menu via a graphical user interface of the user's computing device.

22. The system of claim 14, wherein the plurality of geometric shapes of each map corresponds to predetermined boundaries selected from one of state borders, county borders, city borders, zoning districts, and delivery zones.

23. The system of claim 14, wherein each geometric shape of the plurality of geometric shapes in a given map is non-overlapping.

24. The system of claim 14, wherein the one or more processors is further configured to execute the instructions to:
add, in the data store, a new map to the plurality of maps, wherein the new map comprises a plurality of geometric shapes that are associated with new execution rules that are distinct from execution rules associated with the plurality of maps existing in the data store.

25. The system of claim 14, wherein each map of the plurality of maps shares relationship data with each other map of the plurality of maps.

26. The system of claim 18, wherein the at least one regulated item is one of an alcoholic beverage, a smoking product, a drug, a restricted software product, a permit, and a banking request.

27. A non-transitory machine-readable storage medium comprising machine-readable instructions for causing a processor to execute a method, the method comprising:
receiving from a computing device of a user, at a server, a request to be processed by a geography dependent process executing on the server;
receiving a target location comprising a geographic identifier from the user's computing device;
accessing, by the server, a data store comprising a plurality of maps, wherein each map of the plurality of maps comprises a plurality of geometric shapes and each geometric shape is associated with an execution rule;
determining, by the server, which geometric shape of the plurality of geometric shapes the geographic identifier of the target location is bounded within for at least two maps of the plurality of maps;

generating, by the server, an aggregate rule set based on each execution rule associated with each geometric shape determined to bound the geographic identifier; identifier of the target location; and applying, by the server, the aggregate rule set within the geography dependent computer process to process the request.

28. The non-transitory machine-readable storage medium of claim 27, wherein the geography dependent computer process comprises one of an online transaction, an electronic media execution process, an electronic commerce transaction, and a software download transaction.

29. The non-transitory machine-readable storage medium of claim 28, wherein the geography dependent computer process is an electronic commerce transaction.

30. The non-transitory machine-readable storage medium of claim 29, wherein applying the aggregate rule set comprises:

determining, based on applying the aggregate rule set, whether execution of the geography dependent computer process is permissible; and executing, in response to determining execution of the geographic computer process is permissible, the geography dependent computer process.

* * * * *